US005811800A

United States Patent [19]

Franzen et al.

[11] Patent Number: 5,811,800

[45] Date of Patent: Sep. 22, 1998

[54] TEMPORARY STORAGE OF IONS FOR MASS SPECTROMETRIC ANALYSES

[75] Inventors: Jochen Franzen; Michael Schubert, both of Bremen, Germany

[73] Assignee: Bruker-Franzen Analytik GmbH, Bremen, Germany

[21] Appl. No.: 713,812

[22] Filed: Sep. 13, 1996

[30] Foreign Application Priority Data

Sep. 14, 1995 [EP] European Pat. Off. .............. 95114449

[51] Int. Cl.[6] ............................ B01D 59/44; H01J 49/00

[52] U.S. Cl. ........................... 250/288; 250/282; 250/292

[58] Field of Search .................................... 250/282, 292, 250/288, 287

[56] References Cited

U.S. PATENT DOCUMENTS

| | | | |
|---|---|---|---|
| 3,501,631 | 3/1970 | Arnold | 250/281 |
| 4,962,736 | 10/1990 | Matsuo et al. . | |
| 4,963,736 | 10/1990 | Douglas et al. | 250/292 |
| 5,179,278 | 1/1993 | Douglas | 250/292 |
| 5,283,436 | 2/1994 | Wang | 250/292 |
| 5,420,425 | 5/1995 | Bier et al. | 250/292 |
| 5,569,917 | 10/1996 | Buttrill et al. | 250/292 |
| 5,572,022 | 11/1996 | Schartz et al. | 250/282 |
| 5,572,035 | 11/1996 | Franzen | 250/292 |
| 5,576,540 | 11/1996 | Jilliffe | 250/292 |
| 5,614,711 | 3/1997 | Li et al. | 250/287 |

OTHER PUBLICATIONS

Yulin Huang et al., *Collision–Induced Dissociation for Mass Spectrometric Analysis of Biopolymers: High–Resolution Fourier Transform Ion Cyclotron Resonance MS*[4], Analytical Chemistry, vol. 66, pp. 4385–4389, Dec. 15, 1994.

Steven M. Michael et al., *An ion trap storage/time–of–flight mass spectrometer*, Review of Scientific Instruments, vol. 63, pp. 4277–4284, Oct. 1992.

Erich W. Blauth, *Dynamic Mass Spectrometers*, 1966, Elsevier, pp. 113–115.

J.C. Schwartz, et al. *A Penta–Quadrupole Instruments for Reaction Intermediate Scans and Other MS–MS–MS Experiments*, International Journal of Mass Spectrometry and Ion Processes, vol. 101, Nov. 15.

*Primary Examiner*—Bruce Anderson

[57] ABSTRACT

The invention relates to methods and devices for the temporary storage of ions which are to be subjected to mass spectrometric analysis. Such temporary storage of ions in an RF multipole rod system for their analysis in an RF quadrupole ion trap is known from U.S. Pat. No. 5,179,278.

The invention uses this known temporary storage for such ions which are produced in an ion source from substance peaks from chromatographic or electrophoretich separation devices, or from other devices which feed substances in form of short-lasting peaks. The temporary store thereby accepts sufficient ions of a substance peak for several successive mass spectrometric analyses, so that a mass spectrometric characterization of the substances, which may also require varying measurement methods, is made possible to the desired degree.

Particularly ions from electrophoretically or chromatographically separated substance peaks should be able to be temporarily stored long enough until the mass spectrometric analyses have been concluded to the desired extent. Several temporary stores can collect the ions from several rapidly successive substance peaks. However, short-lasting substance peaks from laser desorptive or pyrolitic processes can also be thoroughly analyzed by means of temporary storage.

20 Claims, 4 Drawing Sheets

TEMPORARY STORAGE OF IONS FOR MASS SPECTROMETRIC ANALYSES

The invention relates to methods and devices for the temporary storage of ions which are to be subjected to mass spectrometric analysis. Such temporary storage of ions in an RF multipole rod system for their analysis in an RF quadrupole ion trap is known from U.S. Pat. No. 5 179 278.

The invention uses this known temporary storage for such ions which are produced in an ion source from substance peaks from chromatographic or electrophoretich separation devices, or from other devices which feed substances im form of short-lasting peaks. The temporary store thereby accepts sufficient ions of a substance peak for several successive mass spectrometric analyses, so that a mass spectrometric characterization of the substances, which may also require varying measurement methods, is made possible to the desired degree.

Particularly ions from electrophoretically or chromatographically separated substance peaks should be able to be temporarily stored long enough until the mass spectrometric analyses have been concluded to the desired extent. Several temporary stores can collect the ions from several rapidly successive substance peaks. However, short-lasting substance peaks from laser desorptive or pyrolitic processes can also be thoroughly analyzed by means of temporary storage.

PRIOR ART

The storage of ions in RF quadrupole rod systems has been known in principle since the time of invention of this principle by Wolfgang Paul.

An application of this storage is described in U.S. Pat. No. 5 179 278. Here, ions from an ion source are temporarily stored before their analysis in an RF quadrupole ion trap in an RF multipole rod system. On the RF multipole rod system, apertured diaphragms with reflecting electric potentials were attached at both ends for the storage of ions. The temporary storage serves to collect ions even during that time period in which the ion trap is being used for the analysis of ions, and therefore cannot accept any ions. In this way the degree of temporal utilization of the ion source as well as the ion trap is increased. In U.S. Pat. No. 5 179 278 it has been estimated by calculation of the storage capabilities of RF multipole ion traps and RF quadrupole rod systems that, depending upon the design of the rod system, the ions can be temporarily stored for much more than just one filling of the ion trap in the rod system. It is however expressly emphasized that "there is little point in collecting more than the $1.1\times10^7$ ions that the ion trap can accept" (Column 5, Line 22 ff).

The unfiltered temporary storage of ions does not however provide any significant improvement, as has already been described in U.S. Pat. No. 5 179 278 by numerical examples, since under favorable circumstances with this method a maximum improvement in the degree of utilization of ion sources or ion traps by a factor of two results, as can be seen in the following example: if the ion source supplies such a minimal ion current that the filling time of the ion trap lasts much longer than the analysis period in the ion trap, the temporary store does not practically represent an improvement since hardly anything is gained by collection during the analysis time. If the ion source provides such a large ion current that the filling time is very short in comparison to the analysis period, there is again no improvement since collection during the analysis time makes no sense. Collection of ions during analysis is sensible only if the filling period is about the same as the analysis period. In order to improve this by a factor of two, yet another condition must be fulfilled in which the ion trap can be filled very quickly from the temporary store. Only if this filling time from the temporary store is very short in comparison to the analysis period, can utilization be improved by the maximum possible factor of two.

It is however the case that RF quadrupole ion traps work extremely quickly nowadays. In the mass range of up to 500 atomic mass units, a spectrum can be scanned in about 15 milliseconds. Even for the mass range reaching to 2,000 atomic mass units, which is of particular interest for biochemical problems today, the ion trap can work with analysis times of about 100 milliseconds. On the other hand, the filling of the ion trap from the RF multipole rod systems used as a temporary store, as already indicated in U.S. Pat. No. 5 179 278, takes several tens of milliseconds, and is therefore certainly comparable with the ion analysis times.

These ratios can also be seen in the numerical examples given in U.S. Pat. No. 5 179 278 and were therefore also known to the inventor. The usefulness of temporary storage in U.S. Pat. No. 5 179 278 is also primarily seen in the ability to filter out undesirable ions in the temporary store. The main claims are therefore already formulated in such a way that only desirable ions are to be temporarily stored and undesirable ions excluded from storage. Various methods are used for the filtration of desirable ions. Only by means of this temporary storage filter is the utilization ratio significantly increased. (At the time of invention U.S. Pat. No. 5 179 278, it was not yet known that undesirable ions could also be filtered out during the filling process of ions in the ion trap.)

For the ions from such ion sources as are located outside the vacuum system, and the ions of which are fed into the vacuum system, the RF multipole rod system can also be used for the thermalization of ions accelerated during the introduction, as described in U.S. Pat. No. 4 962 736. It is true that U.S. Pat. No. 4 962 736 is limited to application in quadrupole mass spectrometers, however it is obvious that this method can also be used for other mass spectrometers which work with ions of uniform kinetic energy.

Temporary storage and thermalization can however not only be done in RF multipole rod systems. The author of the present patent application introduced a new class of ion-optical systems in patent application U.S. Ser. No. 08/565 107 at the United States Patent and Trademark Office which can be used as guidance systems, storage systems and thermalization systems. The text describing this application is to be included here completely.

With the exception of the patent cited, the possibility of temporary ion storage has not been further pursued until now, although systems for the thermalization and guidance of ions have become more widespread in the meantime and have been applied in commercial mass spectrometers of various types since the beginning of this year.

On the other hand, suiting mass spectrometric measurement methods to the increasingly briefer substance peaks of modern substance separation methods has remained an unsolved mass spectrometric problem. Separation methods such as capillary electrophoresis and liquid chromatography with microcapillary columns are being developed for time-saving reasons into faster and faster methods. Nowadays they provide the separated substances in peaks which only last a few 10 to 100 milliseconds. Mass spectrometry is just barely in a position to provide summary spectra of the substances from the substance peaks.

For mass spectrometric analyses of larger organic molecules, especially biomolecules and polymers, increasingly complicated mass spectrometric measurement and characterization methods are being used however today. It is often thereby necessary to employ several different measurement methods one after another, whereby subsequent measurement methods often are dependent upon the preceding ones and must be controlled according to their results. An example of this is the method of measurement of fragment ions (or daughter ions) of selected primary ions (or parent ions), for which the primary ion spectrum must first be scanned from which the parent ions are only then determined. This is even more complicated when scanning granddaughter ion spectra from selected daughter ions.

At the moment these complicated mass spectrometric measurement methods cannot yet be coupled with physicochemical separation methods at all. Even other forms of peakwise feeding of substances or substance mixtures cannot be coupled with these methods since these methods have until today required a continuous feeding of substances over the duration of all measurements. Though the measurement methods only last a few hundred milliseconds each, and an immediate evaluation of the spectra will soon be possible due to modern data evaluation, many seconds of measurement time come together very quickly even during automatic immediate evaluation, not to mention that often several repetitions of the measurements are desirable for improvement of the signal-to-noise ratios and for confirmation of the measurement results.

It therefore remains an unsolved problem to be able to characterize the substances from the substance peaks using a single feeding, i.e. the most minimal use of substance, as comprehensively as possible while utilizing the mass spectrometric analysis methods possible today, such as low-resolution mass spectra, high-resolution mass spectra, neutral loss spectra, daughter ion spectra (MS/MS) of selected parent ions or even granddaughter ion spectra (MS/MS/MS) of selected daughters. The types of desirable analyses could even be considerably expanded if reactant gases are fed and the resulting product ions are analyzed again by the various methods, whereby, e.g., information regarding the convolution structures of complicated molecules will be possible.

OBJECTIVE OF THE INVENTION

A method and a device must be found with which substances from one or several successive substance peaks from modern substance feeding systems can be analyzed in a diverse manner with various types of mass spectrometric analysis methods, as comprehensively as possible for various characteristics, without needing to repeat substance feeding several times, which increases the use of substance and extends the analysis period.

The most comprehensive as possible analysis of different characteristics is designated here briefly—according to the literature—as "Characterization of the Substance". The "substance peaks" are characterized by the brief period in which the ions of a substance are available for measurements, whereby the shortness of time must be seen as relative to the total time of the measurement.

For the feeding systems, these can be electrophoretic or chromatographic separation systems, for example, or also laser desorption on surfaces, rapid pyrolysis methods or other methods by which substance peaks are generated. Here it should be possible to thoroughly analyze the substances from individual substance peaks separately, or also several substance peaks combined, under various aspects.

DESCRIPTION OF THE INVENTION

It is the basic idea of the invention to redesign the temporary store for ions, which is known but previously only used in connection with ion filtration, so that it can approximately completely accept all the ions of a substance peak, and to then analyze the ions from the temporary store mass spectrometrically a portion at a time using various methods. The temporary store should therefore be able to accept sufficient ions from a substance peak of a feeding system to enable a desired characterization of the analysis substance in successive mass spectrometric analyses of these ions from the temporary store using various methods. For each analysis, only a fraction of the ions is removed from temporary storage.

Such temporary storage of ions had not suggested itself until now. Even today, ionization by electron impact is still the prevalent ionization method for the mass spectrometric identification of substances; practically all mass spectra of the commercially available spectra libraries were obtained in this way. The recognition of a substance by this ionization method is dependent however upon the fact that not only molecule ions but also fragment ions are formed and measured in certain proportions. This measurement must occur quickly, since a large part of these ions are instable and decompose in time. The known differences of the mass spectra of a substance which were measured with magnetic field mass spectrometers, quadrupole mass spectrometers and ion trap mass spectrometers are largely dependent upon this decomposition of metastable ions which advances at differing degrees due to the varying operating times of ions in these types of mass spectrometer and thus apparently distorts the mass spectrum. A much longer lasting temporary storage of these ions would distort the mass spectrum even further and preclude identification of the substances.

For many of today's mass spectrometric analyses of biochemical substances, this no longer applies though. The ionization methods necessary for this, such as electrospray (ESI), chemical ionization at atmospheric pressure (APCI), or matrix-assisted laser desorption ionization (MALDI) primarily generate only unfragmented ions of the original molecule; practically no fragment ions are formed without special measures. For a characterization of these substances when using these ionization types, it is therefore at least necessary to fragment the ions later during mass spectrometric analysis, such as occurs due to the differing MS/MS methods such as collision gas fragmentation in ion traps or in collision chambers of tandem mass spectrometers (CID), photon fragmentation in ion traps (PID), or by "post source decay" (PSD) in time-of-flight spectrometers. More intensive characterizations demand even more extensive analyses, such as MS/MS/MS or studies describing the locations on an ionized molecule where reactant gas molecules could be attached.

The invention is therefore primarily used by these new types of ionization. However, this invention is expressly not limited to these types of ionization. Also for the previously standard ionization types, such as for mixture analysis with electron impact and MS/MS, greater advantages result from this invention.

Various mass spectrometric principles can be used for the analyses, such as RF quadrupole ion traps, ICR mass spectrometers, or also tandem mass spectrometers of different types, such as the triple quadrupole mass spectrometer ("triple quad"). In tandem mass spectrometers, the analysis ions ("parent ions") are filtered out during their flight through a first mass spectrometer, fragmented in a collision cell, and analyzed in a second mass spectrometer for ionized fragments ("daughter ions"). In RF quadrupole ion traps as well as in ICR ion traps, these steps are performed one after another in the same storage cell, which is why one also speaks of "temporal tandem mass spectrometry" ("tandem in time").

During these analyses, various mass spectrometric analysis methods may be applied such as the scanning of both low and high resolution primary spectra, neutral loss spectra, daughter ion spectra of selected parent ions (MS/MS) or even granddaughter ion spectra of selected daughters (MS/MS/MS). The types of analysis can even be considerably expanded if reactant gas is fed to the ions being analyzed and the resulting product ions are analyzed. The reactant gases can also be fed in the mass spectrometer, or already in the temporary store. The substance peaks can be peaks of completely separated individual substances from physicochemical separation methods, as well as peaks from substance mixtures with many individual substances, such as are released in pulsed pyrolytic decomposition processes or through laser pulse desorbing surface analyses. Also ions from matrix-assisted laser desorption (MALDI), particularly from substances separated by two-dimensional gel electrophoresis, belong to this group of feeding systems with substance peaks.

For substance peaks from separation methods, the separation method can be switched off after filling the store with ions if another substance peak is approaching, before analysis of the preceding substance is finished. Both electrophoretic and liquid chromatographic methods can be interrupted without fundamentally degrading the quality of the separation. Gas chromatographic separation can also be interrupted, but in this case the subsequent separation suffers from inferior substance separation since the substances in the carrier gas can much more easily diffuse, and the switching off of carrier gas flow drastically changes the pressure and volume ratios every time. For two-dimensional gel electrophoresis, separation is already concluded before the analysis, the substance peaks are generated due to the advance of the carrier plates vis-à-vis the scanning beam of the laser.

Since not all separation methods are interruptable without damage, though the interruptions certainly extend the analysis period, it is a further basic idea of the invention to use several temporary stores for ions from several peaks from such electrophoretic or chromatographic separation methods in the vacuum system of the mass spectrometer. In this way ions from separation methods could be temporarily stored without switching off the separation method if some substance peaks follow one another in such short times that the time between the peaks is not sufficient for a desirable mass spectrometric characterization. The occurrence of situations in which the separation method must then itself be interrupted is considerably reduced due to the normally irregular distribution of substance peaks over the separation time.

The temporary store in U.S. Pat. No. 5 179 278 functions as a through-passage store, although this present invention is expressly not limited to this. Through-passage stores however constitute the simplest type of temporary storage. They have one entrance assigned as such for the ions which are to be stored, and an exit which is normally situated across from this by which the ions leave the store.

It is a further basic idea of the invention to design the through-passage store in such a way that it propels the ions with permanent or temporary thrust in the direction of the ion output. In this way filling the temporary store is easier since the ions are immediately pushed away from the ion entrance and no space charge barrier is able to form. Additionally, removal of the ions becomes easier and faster since the ions are already assembled in front of the exit and maintain a certain ion density due to the ion thrust. Without such an ion thrust in the direction of the exit, the ions would oscillate back and forth within the temporary store, as described in U.S. Pat. No. 5 179 278, at thermal velocity between the reflecting potentials at the ion entrance and ion exit along the axis of the rod system, whereby the emptying time is expanded to at least two complete oscillations, meaning several tens of milliseconds.

The ion thrust within the temporary store toward the ion exit can be realized in various ways. Thus it is possible for all temporary stores to generate a weak electrical DC field along the axis which drives the ions toward the exit, when they are impeded during the storage phase in the desired manner by the switchable reflective potential at the outflow and are stored in this way.

In multipole rod systems, a DC field can be generated in which all rods, in addition to their supply of RF voltage, are traversed in the same direction by a DC current. For this reason it is advantageous to manufacture the rods from a resistant material. Generation of an axial DC component in ring systems or in double helix stores is described in U.S. Pat. No. 08/565 107.

On the other hand, a permanent thrust toward the ion exit can also be generated by using a conical instead of a cylindrical store. With a conical multipole rod system, or also with other RF ion guide systems, the ions within the store are driven constantly in the direction of the enlarged opening by a weak pseudo-potential field. However it is a disadvantage of the conical multipole rod system that the pseudo-potential wall for confining the ions becomes lower and lower toward the more open end of the rod system.

The store described in U.S. Pat. No. 08/565 107, designed as a double or multiple helix store, does not have this disadvantage if the turns of the helices maintain the same spacing even in the more open area of the cone. The double helix and its higher offspring, such as the quadruple helix or sextuple helix, are therefore especially suitable as temporary stores.

An arrangement of several temporary stores in series can easily be realized by such through stores. When using the series arrangement, the ions from the first substance peak are led through to the last store before the mass spectrometer, and starting there they are mass spectrometrically analyzed in the described manner. The ions from a substance peak appearing briefly thereafter are led to the next to the last store and are stored there if the analysis of the previous peak has not yet been concluded. The ions from a third substance peak can be held in the third store from the end. When the analysis of ions in the last store is completed, this last store is then completely emptied by a brief switching off of the RF voltage and the ions from the next to the last store are transferred to here. In an analogous manner, the ions from the other stores are then also passed on ("bucket brigade principle").

The outflow of ions from the temporary store is made possible by opening the reflector at the end of the temporary store. It is favorable to employ switchable lenses here which remove the outflowing ions by suction from a small area at the temporary store and can focus these ions into the next stage of processing. The small catchment area of the switchable lens is refilled from the afterflow of ions, especially if the ions are subjected to a forward thrust toward the exit.

With the same conditions at the switchable lens, the outflow velocity of the ions is then only dependent upon the ion density in the temporary store, i.e. on the degree of filling. This correlation can be determined by experiment and then used, for example, to control the filling of ion traps in successive fillings, always just up to the space charge limit, or also to generate a uniform outflow by alteration of the lens voltage, such as is used for a subsequent tandem mass spectrometer for example.

The selective filling of an ion trap with selected parent ions just up to the space charge limit can also be controlled in this way. At the same time, the ions are filtered during the filling in the known manner usually by the admission of a frequency mixture which drives the undesirable ions out of the ion trap, however leaving the desirable ones in it. From the primary ion spectrum, the ratio of selected parent ions to the total charge is known, and from the known filling velocity and the known efficiency of filtration, filling controlled up to the optimal degree of filling.

Figure 1:
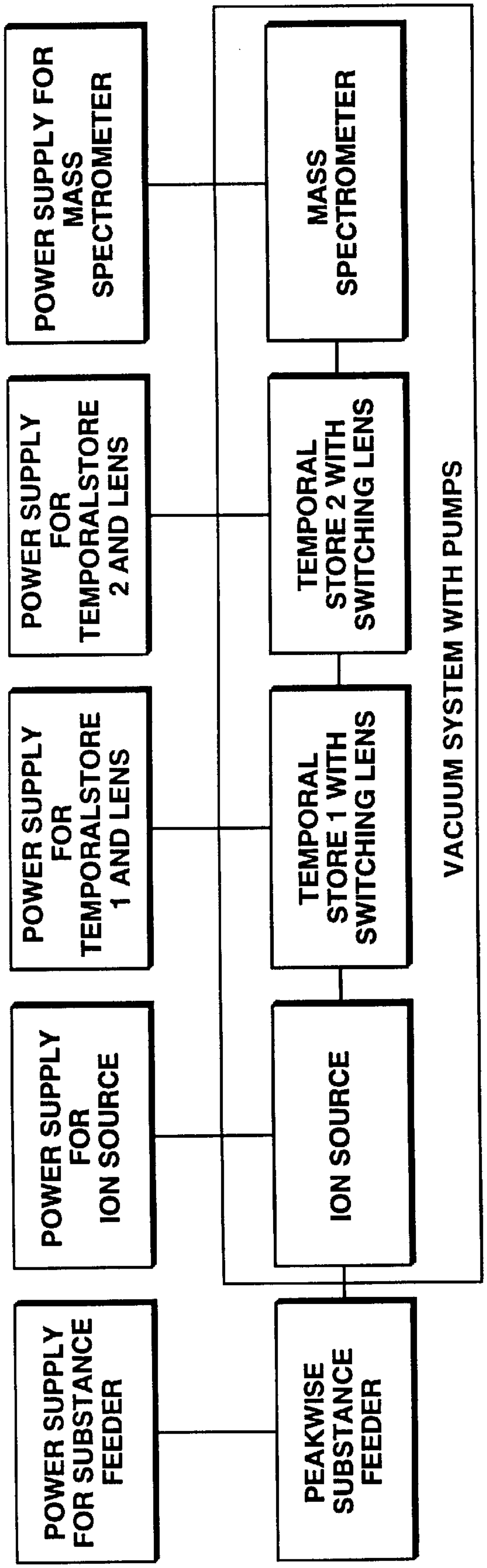
FIG. 1 shows a block diagram of a mass spectrometer with two temporary stores in accordance with this invention. A substance feeding system feeds substances in peaks to an ion source which is, in this example, located in the vacuum system of the mass spectrometer. As examples of substance feeding systems which operate peak by peak, all chromatographic and electrophoretic separation methods, as well as pyrolytic or laser desorptive methods, may be considered. The ions from the substance peaks can be held in both temporary stores 1 and 2. The ions from temporary store 2 are analyzed a portion at a time in the mass spectrometer until a sufficient characterization of substances has been obtained from the substance peak, or the ions have been used up. The temporary stores can certainly be designed in such a way that they can accept ions for a large number of subsequent mass spectrometric analyses. Space charge limitations only play a secondary role during temporary storage.

A strong current of ambient gas is suctioned through the input capillary (13) into the vacuum chamber (14), which is evacuated via pipe-joint (25). In this current, a portion of the ions are viscously entrained. The gas current expands adiabatically in the chamber (14) of the first differential pump stage, whereby the entrained ions are accelerated to velocities of about 1,000 meters per second. A part of the ions can leave the vacuum chamber (14) through the minute opening in the skimmer (15) and enter the vacuum chamber (17) of the next differential pump stage which is evacuated by pipe-joint (26). The ions then enter into the temporary store (16). In this temporary store (16), the ions are captured, remaining there long enough until their kinetic energies have thermalized, which lasts only a few tens of milliseconds at a prevalent pressure of about $10^{-2}$ millibar.

The thermalized ions from the first substance peak are then led through temporary store (18) into temporary store (20), where they are stored. From this store, the ions are transferred portion by portion into the mass spectrometer represented as an RF frequency quadrupole ion trap and are analyzed there. The ion trap consists of both end cap electrodes (21) and (23) and the ring electrode (24). The ions are selected by mass during the analysis methods, ejected from the ion trap through the end cap (23) and measured in the ion detector (24).

Figure 4:
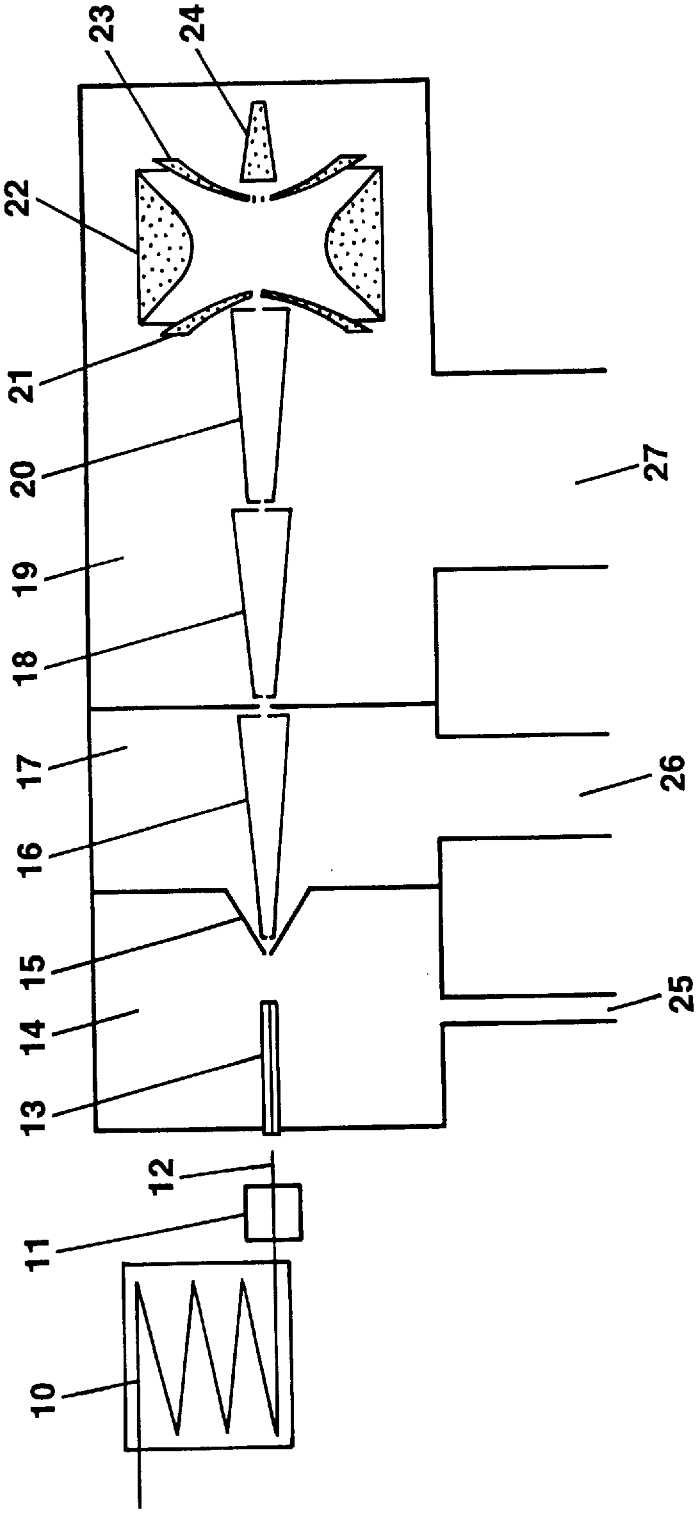
FIG. 4 shows the arrangement of a mass spectrometer with three temporary stores as a schematic, whereby the individual function units are represented only symbolically, and the electrical and vacuum supply units are not shown at all. Here the ion source is located—in contrast to the block diagram in FIG. 1—outside the vacuum system of the mass spectrometer. The peak by peak feeding of substances is handled by a chromatrographic or electrophoretic capillary column separation device, whereby the separation capillary (10) is shown only symbolically here. The substances are first detected in a detection unit (11), which can for example be a UV absorption unit, and then fed to the needle (12) of an electrospray ion source. Between this needle (12) and the input capillary (13), which transfers the ions into the vacuum system, there is an electrospray voltage of several kilovolts, through which the carrier liquid as well as the detached analysis substances in it are sprayed. Doing this ordinarily ionizes the molecules of the analysis substance completely and without fragmentation.
Figure 5:
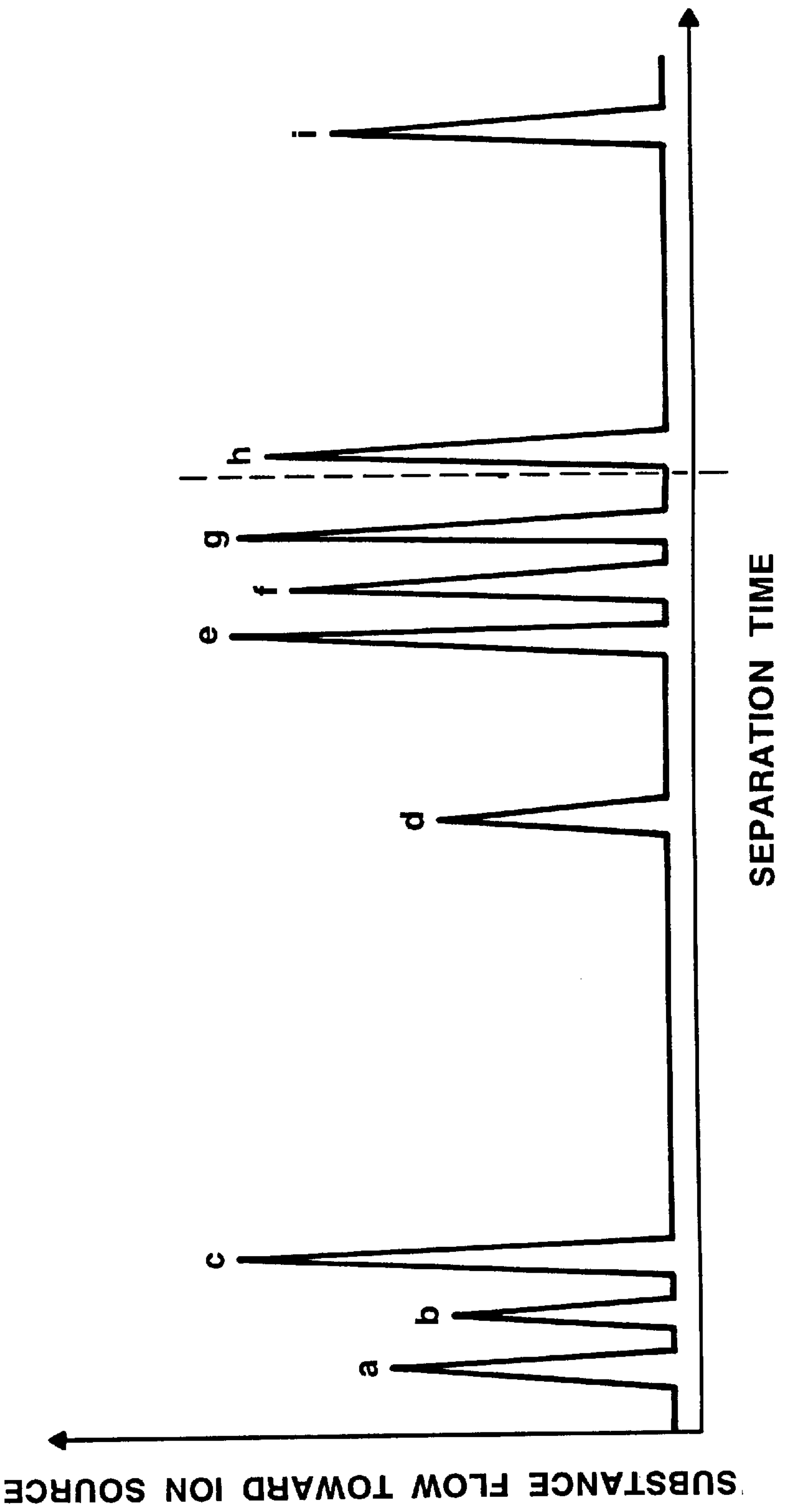

FIG. 5 shows a diagram of the separation of substances in a separation system. The temporally separated substances (a) to (i) are fed as substance peaks to the ion source and ionized. If a mass spectrometer as in FIG. 4 with three temporary stores is used, the ions from the quickly successive substance peaks (a), (b) and (c) can be brought in this way into the last (20), next to the last (18), and third from the last (16) temporary store, and stored there. The ions from substance peaks (a), (b) and (c) can then be analyzed before substance peak (d) arrives, the ions of which can then be stored in the last temporary store (20). Before substance peak (e) arrives, the ions from (d) have already been analyzed. Peaks (e), (f) and (g) can again be temporarily stored. This does not apply to substance peak (h); here, at about the broken line, the separation method must be interrupted for a short time, however only long enough until the ions from substance peak (e) are analyzed.

PARTICULARLY FAVORABLE EMBODIMENTS

The embodiments described here concern the coupling of an ion trap mass spectrometer with the separation method of capillary electrophoresis, particularly as can be used for the separation of proteins. The ionization is performed by electrospray at atmospheric pressure, whereby proteins detached in the electrolyte of the electrophoresis are ionized without fragmentation and with a practically complete yield. Such an arrangement with three temporary stores is illustrated as a schematic in FIG. 4. From the schematic, any expert can produce the arrangement of the function elements which are for the most part commercially available.

This embodiment is particularly favorable, in so far as it couples very fast capillary electrophoresis, with its very brief substance peaks, to a type of mass spectrometry which can be varied in multiple ways, including the scanning of daughter and granddaughter ion spectra, and including the switching on of ion-molecule reactions with any reactant gases and analysis of the product ions. However, these types of analysis take their time, particularly if several of such methods are to take place in a series with feedback control from the results of preceding analyses, and were not at all couplable until this invention with fast separation methods, even if only very few substances were separated during the separation methods.

The schematic in FIG. 4 illustrates capillary electrophoresis only symbolically by the capillary column (10). At the end of the capillary column, the substance flow is detected in order to determine the substance peaks. Detection can, for example, occur within the capillary via a commercial UV absorption unit (11).

The capillary column ends in an electrospray needle (12). Between this electrically conductive needle (12) and the end surface of the input capillary (13), an electrospray voltage of several kilovolts is applied. The strongly non-uniform electrical field at the tip of the needle thereby attracts a practically continuous stream of minute droplets from the electrophoresis liquid. Therefore it is useful to surround the electrospray needle coaxially with a second needle which can provide an equalization of liquid currents, since the electrophoresis supplies electroosmotic liquid propulsion which is very small and which can even be directed into the electrospray needle while the electrophoretically migrating analysis substances migrate out of the needle. The minute droplets of liquid have a strong electrical charge and evaporate quickly, whereby the large substance molecules usually remain behind, charged through a mechanism which is not yet fully explained.

The charged droplets and the charged molecules are moved within the electrical field toward the end surface of the input capillary (13), whereby a balance prevails between the tractive force of the electrical field and the brake force in the surrounding gas. This process is known as "ion mobility". Normally a heated, clean gas is fed into the intermediate area between the electrospray needle (12) and the input capillary (13), frequently nitrogen, in order to encourage the evaporation process and to keep the liquid vapor from entering the vacuum.

From the input capillary (13), which is about 15 centimeters long and has an inside capillary diameter of 500 micrometers, a continuous gas current is transported into the vacuum of the first differential pump chamber (14) of the vacuum system. As a result, a portion of the ions are suctioned viscously into the input capillary (13), and from these ions another portion passes into the chamber (14) without any discharging wall collisions. In the last section of the capillary, a strong acceleration of the gas takes place due to adiabatic expansion, by which the ions reach a velocity of about 1,000 meters per second. Normally a pressure of several millibar is maintained in the chamber by a pre-vacuum pump via pump pipe (25).

In the chamber (14) a portion of the ions can cross through the chamber (14), supported by a light electrical field, and reach the next chamber (17) of the differential pump device through a minute opening of about 1.2 millimeters diameter in the tip of the skimmer (15). This chamber (17) is kept at a pressure of several $10^{-2}$ millibar by a turbo-molecular pump via pipe-joint (26).

The ions entering through the skimmer (15) into the chamber (17) are captured and accepted practically without loss by the temporary store (16). Due to the relatively high vacuum pressure of several $10^{-2}$ millibar, their kinetic velocities are thermalized in a few tens of milliseconds. It is therefore useful to first collect all ions from a substance peak in this temporary store, keep them temporarily stored there after completion of the substance peak for about 30 milliseconds, and only then guide them on into the next store (18) or (20).

Figure 2:
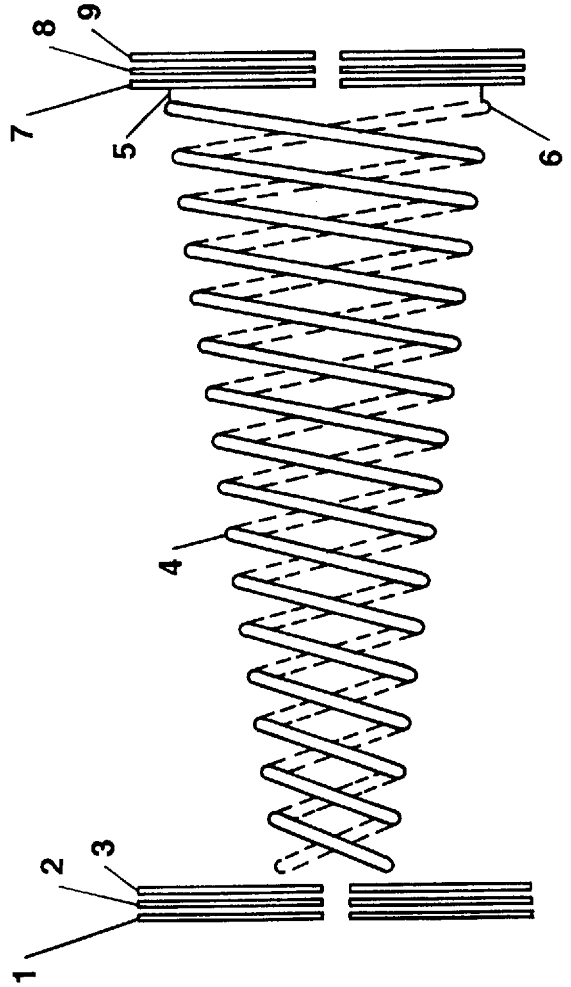
FIG. 2 shows such a temporary store, designed here as a double helix (4). The double helix (4) is located between the lens system (1, 2, 3) at the entrance of the intermediate store and the lens system (7, 8, 9) at the exit of the temporary store. On the diaphragms (3) and (7), there is a potential which drives the ions back respectively into the double helix. The RF voltage for the storage is fed by the connections (5) and (6). By switching the potential on the lens aperture (8), the ions can be suctioned out of the temporary store and fed to a subsequent system.

The temporary store (16) optimally consists of a conically formed double helix, as it is illustrated in FIG. 2. The connecting wires (5) and (6) of the double helix are joined to both phases of the RF voltage of a corresponding RF generator. The inside walls of the double helix reflect the ions in the same way as the inside walls of an RF multipole rod system. The reflecting pseudopotential can be kept at the same high level in the double helix by consistent spacing of the coils, even in the case of a conical system. This is different then for multipole rod systems, by which the amount of pseudopotential drops toward the open end of the cone. The conical form generates a permanent forward thrust of the ions toward the more open end of the cone; this thrust is determined by a weak pseudopotential in the axial direction.

Figure 3:
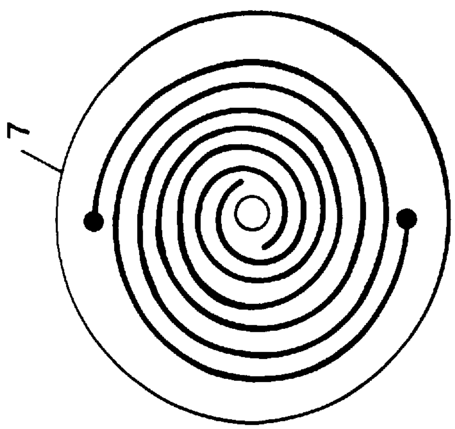
FIG. 3 shows a particular type of reflection of stored ions at the end of the double helix, designed here as an RF supplied double spiral on an isolating carrier **(7*a*). The carrier (7*a*) replaces the potential diaphragm (7) of the output lens in FIG. 2. The double spiral is supplied by the same RF voltage as the double helix (4). The double spiral on the carrier (7*a*) has, vis-à-vis a metallic conductive potential diaphragm (7)**, the advantage of a more greatly reduced range for the reflecting pseudo-potential, so that more ions can be stored, and removal of ions from the temporary store takes place more quickly.

The temporary store (16) is closed on both sides by reflecting electrical potentials. At the entrance into the temporary store, there is a real potential between the skimmer (15) and the middle potential of the RF voltage. At the output, a more favorable termination can be obtained through a double spiral **(7*a*), as depicted in FIG. 3. The double spiral is connected to the same RF voltage as that supplying the double helix, generating a reflecting pseudopotential that has a much more reduced range than a real potential extending over an area. The double spiral can be generated for example by vapor depositing a spiral conductor on an isolator. The isolator can also be very easily fastened to the wall of the chamber (17)**. The manufacture of an extremely mechanically stable, however gas permeable double helix is described in U.S. application Ser. No. 08/565 107.

The double spiral forms part of a switchable lens which is fitted with a central aperture (8). If the central aperture is switched to an ion-repelling potential, the output is closed in this way. If however a suctioning potential is applied, the output is opened. The ions from near the lens opening are suctioned, accelerated into the lens, then focused, and rushed into the next temporary store (18), decelerating.

Both temporary stores (18) and (20) are located in the main chamber (19) of the vacuum system which is evacuated by a turbo-molecular pump via pipe-joint (27). Both temporary stores (18) and 420) are designed like temporary store (16), only the potential difference located on the input end is not formed by the skimmer (15), but rather by the last aperture of the lens from the respective previous stage.

The exit from the temporary store (20) takes the ions into the ion trap mass spectrometer which consists of two end caps (21) and (23) and the ring electrode (22). The function of the ion trap mass spectrometer will not be discussed further here since it is known to any competent expert. It should however be noted that the filling of such an ion trap mass spectrometer is very critical since the function of the mass spectrometer is impaired by space charge effects above a threshold of the filling quantity. The mass resolution particularly decreases. As of the second filling, the filling procedure can proceed using the results from the first spectral measurement, by which, among other things, the total charge in the ion trap is also measured, and be controlled in such a way from the known reduction in the ion count in the temporary store (20) that no overloading of the ion trap occurs. The charging process can be calibrated by experimentation.

If a substance peak of the electrophoresis only contains 10 femtomol of a substance, this is then $6\times10^9$ molecules. Ten femtomol of a substance is extremely little; this small amount is hardly sufficient for UV detection. In comparison: a spot on a gel electrophoresis plate needs at least 100 picomol to 10 micromol in order to become visible after tinting, therefore at least 10,000 times more substance for a visual detection. The molecules of this 10 femtomol substance are almost completely ionized in the electrospray ion source. If 1/1,000th of the ions formed can then be transferred into a temporary store in a vacuum, $6\times10^6$ ions are then stored. The ion count of an ion trap at the space charge limit is often incorrectly given as $10^6$ ions; in reality it is only about $3\times10^4$ ions for a high performance ion trap. If 10% of each ion portion removed can be transferred into the ion trap and stored there, 10 femtomol of the substance peak is sufficient for 20 fillings of the ion trap. This numerical example demonstrates the high sensitivity of mass spectrometric methods.

However, the numbers in the example are today still within the limits of feasibity and can be achieved today only under favorable conditions. It can be however expected that they can be achieved routinely with the progress of technology, experience and development. Many more ions can be stored in a temporary store however than indicated in this example. A well designed temporary store accepts about $10^9$ ions, i.e. a good hundred times the number in the above example. Under the above indicated favorable conditions, all ions of a substance peak transferred into the vacuum can therefore still be collected, corresponding to about one picomol of substance. With this number of ions, the ion trap can be filled about 2,000 times if the filling is done without filtration of the ions. This is however exactly the strong point of the methods in which only selected ions are analyzed, therefore filtering the ions during their storage in the ion trap so that only one type of ion is stored. With this technology, the number of possible fillings drops steeply.

In the numerical example, it was assumed that only one ion from every 10,000 is available for analysis. The other 9,999 ions are lost during the transfer into the vacuum and into the ion trap. If transfer with fewer losses becomes feasible in the future, it is possible that substance amounts of one femtomol or even 100 attomol could then be characterized.

The measurement method can best be described using the substance flow of an electrophoresis chromatrogram, as depicted in FIG. 5. Let it be assumed that the substance is a mixture of peptides which have been produced from an unknown protein by digesting with trypsin. This method is well established in biochemistry and is normally applied for the identification of proteins. As soon as a first substance peak (a) of this peptide mixture has been determined by the substance detector (12), the exit of the first temporary store (16) is closed so that the ions of substance peak (a) can be stored in it. Once the ions of the substance peak (a) are completely collected, there is a wait of only about 30 milliseconds for the thermalization to be completed and the ions of this substance peak (a) are then guided on into the last temporary store (20) and stored there.

Then begins the analysis of these ions from substance peak (a). For example, a normal, low-resolved spectrum is first scanned, whereby it is determined that this concerns the ions of a peptide with a molecular weight m calculable from the spectrum, charged n-times, (n+1)-times, (n+2)-times, . . . , (n+i)-times. In the next analysis step, for example, the doubly charged ions of this peptide could be stored in the ion trap by isolation using known methods, then collisionally fragmented by a slight supply of energy and finally analyzed. A fragment spectrum can then be measured which already leads to a first amino acid sequence analysis of this peptide. Since however two pairs of the about twenty aminoacids cannot be differentiated by their molecular weight, it may prove necessary to measure a granddaughter ion spectrum of a selected daughter in a third step, in order to arrive at a definite sequence. A series of partial sequences can such be determined for unknown proteins. This type of analysis is one of the most simple, and due to partial sequences of some peptides, the analyzed protein can be identified if it is already known.

In the meantime, the ions from substance peak (b) in temporary store (18) are stored and the ions from substance peak (c) are in temporary store (16). After analysis of the ions from substance peak (a), temporary store (20) is then completely emptied by shutting off the RF voltage for about 20 milliseconds. Then the ions from temporary store (18) are transferred into temporary store (20) and analyzed out of it. The ions from temporary store (16) are taken into temporary store (18) and temporary store (16) is again available for the storage of ions from a new substance peak.

In this way the substance peaks can be analyzed one after another without switching off the electrophoresis. Only if, as in the case of substance peaks (e), (f), (g) and (h), the substance peaks follow one another so closely that time for analysis is not available, the electrophoresis must be interrupted by switching off the electrophoresis voltage briefly.

The temporary store can collect a very large amount of ions, since harmful influences due to space charge have only been observed very limitedly in them. The temporary store, as explained above by the numerical example, is certainly sufficient for about 2,000 unselected fillings of the ion trap as used for the scanning of simple mass spectra. On the one hand, there is not sufficient analysis substance available in order to really fill the store with one substance peak. On the other hand, during the scanning of daughter spectra from selected parent ions, only the selected parent ions are stored in the ion trap and the remaining ions are eliminated, thus the number of daughter spectra (and granddaughter spectra) for this filtering storage is far less in accordance with the concentration of parent ions (or even daughter ions).

The invention is however not limited to the particularly favorable embodiment described here. Rather there are a large number of slightly varied embodiments in contrast to this particularly favorable embodiment which all have their special advantages. The variations can easily be made by a competent expert and are therefore not described in the same detail as above.

Thus not only capillary electrophoresis can supply appropriate substance peaks, but also liquid chromatography, particularly one with microcolumns. Even gas chromatography can be implemented in this way, whereby it may be favorable for the latter to again increase the number of temporary stores.

The detection of substance peaks need not be done by UV detectors. Through the method of dividing up currents of carrier gas or liquid ("splitting"), a partial current can be analyzed in any standard detector in order to detect the substance peaks. Thus besides many other detectors, the flame ionization detector (FID), standard in gas chromatography, can for example be used. However a double ion source may also particularly be used, whereby a partial ion current is branched off for the detection of substance peaks. A part of the ion current can also be branched off and measured after transfer of the ions into the vacuum.

Nor do the substance peaks need to be supplied by physical-chemical separation methods. Substance peaks can also originate from pulsed pyrolyses, for example the known Curie point pyrolyses, or from desorptions which have been induced by laser pulses. In this case detection of the substance peaks is not necessary since the times for the appearance of the substance peaks are already known. Also, for these types of analysis, fewer temporary stores are required since the clock-pulse rate can be controlled by the method itself. If the thermalization should continue to take place in its temporary store, a total of two temporary stores are sufficient, one for the thermalization and one to supply the mass spectrometer. For pyrolysis though, very large temporary stores are generally required since pyrolysis mixtures are very complex and many successive analyses are required, often with selective storage of rare ion types.

This invention is particularly helpful for the analysis of ions from pyrolysis procedures. The substances from pyrolysis vapors can attain very high molecular weights. These molecules cannot be subjected to any wall collisions since they otherwise immediately condense out into the form of the known pyrolysis tar. Rather they must be immediately ionized, for example by chemical ionization at atmospheric pressure (APCI). As ions, they can be better guided without collision than in the form of neutral molecules. Long-lasting storage for several successive analyses is actually only possible in the form of ions.

Instead of electrospray, chemical ionization at atmospheric pressure (APCI) can also be used for the ionization of substances. This type of ionization is especially favorable for pyrolysis vapors and desorption vapors, but also for substances which were separated by gas chromatography.

The introduction of ions into a vacuum can also proceed in a different manner, as shown in FIG. 4. Simple, nozzle-like openings, for example ones with 30 micrometer diameters, have been used very successfully, although they require much larger pumps than the above-described input capillaries.

The input capillary (13) can also be designed much shorter, but also with a smaller inside diameter. The gas current into the vacuum system is then much more reduced, and the differential pump stage (14) can be completely dispensed with. The input capillary (13) then leads the ions directly into the first temporary store (16) of the differential pump chamber (17). The most favorable method of introducing the ions into the vacuum—aperture, wide capillary, narrow capillary—is dependent upon how narrow the space is in which the ions are formed and how many ions are formed.

The number of temporary stores in the main vacuum chamber (19) can of course be suited to the measurement problem. There can only be one temporary store there, for example for the analysis of pyrolysis vapors or desorption ions, although there could also be four or more temporary stores installed if primarily complex mixtures are being analyzed with rapid separation. Since the ions can be transferred from one store to the next with relatively little loss, the number of temporary stores is freely selectable.

Even the ion trap mass spectrometer (21, 22, 23) can be replaced by other types of mass spectrometer. For the scanning of highly resolved mass spectra of primary ions or secondary (daughter) ions, ion cyclotron resonance mass spectrometers (ICR or FTMS) are particularly well suited. Since the scanning of mass spectra can last especially long with the ICR spectrometer, according to the requirements for mass range and mass resolution, the invention is particularly advantageous for the ICR mass spectrometer.

However other types of mass spectrometer, in particular all types of tandem mass spectrometer, can also be used. Since these mass spectrometers must be supplied with a continuous current, the switchable lens of the temporary store (20) can be controlled here in such a way that there is continuous outflow over a long period of time.

The mass spectrometry expert, with the knowledge of his specialized area within mass spectrometry, can easily find further examples for the advantages of using this invention.

We claim:

1. Method for the mass spectrometric characterization of ions from substances which are delivered peakwise by a substance supply unit, comprising the following steps:

(a) delivering a peak of substances to an ion source and forming substance ions thereof, (b) transferring the ions to each of a plurality of temporal ion stores and storing the ions therein, (c) extracting a fraction of the ions from one of the ion stores into the mass spectrometer for a specific investigation, and (d) repeating step (c) with different types of investigations, until either the ions of the substance peak are sufficiently characterized, or the ions in the stores are exhausted.

2. Method as in claim 1, wherein the temporary stores are arranged in series.

3. Method as in claim 2, wherein the temporary stores collect the ions from further substance peaks as necessary and pass them on as necessary to the next respective temporary store.

4. Method as in claim 1, wherein multipole RF ion guidance systems are used as temporary stores, being closed for the ions at both ends by reflecting potential distributions, from which however at least one potential distribution is switchable to ion passage.

5. Method as in claim 4, wherein an RF multiple rod system is used as at least one of the temporary stores.

6. Method as in claim 5, wherein at least one of the temporary stores comprises a conically formed interior, so that there is a permanent thrust of ions in an axial direction.

7. Method as in claim 5, wherein an electrical DC field is generated at least temporarily along the axis of at least one of the temporary stores.

8. Method as in claim 4, wherein a system made up of rings arranged perpendicular to an axis, which are connected in alternating sequence with the phases of an RF voltage, is used as at least one of the temporary stores.

9. Method as in claim 4, wherein at least one of the temporary stores comprises a double or multiple helix operating with both opposing phases of an RF voltage.

10. Method as in claim 1, wherein a RF quadrupole ion trap or ICR ion trap is used as a mass spectrometer.

11. Method as in claim 10, wherein the ion trap is only filled to the space charge limit, and the filling process is controlled by the filling rate of the preceding filling, by the known decrease of ion density in at least one of the temporary stores and by the effective rate of a ion filter which may be switched on.

12. Method as in claims 1, wherein the mass spectrometer concerned is a spatial tandem mass spectrometer.

13. A mass spectrometric system for the characterization of substance ions, consisting of (a) a substance supply system which supplies the substances in recognizable peaks, (b) an ion source for the ionization of substance molecules from the substance peaks, (c) a plurality of temporary stores of sufficient size for the temporary storage of all ions from a substance peak, (d) a mass spectrometer capable of various types of analyses on portions of ions, and (e) a control system which recognizes the substance peaks, stores the ions of a peak in an empty store, and causes the mass spectrometer to analyze the ions, portion by portion, in various predetermined ways.

14. Device as in claim 13, wherein several temporary stores are present in series between the ion source and mass spectrometer for the collection of ions from several substance peaks.

15. Device as in claim 14, wherein a first of the temporary stores is located in the first stage of a differential pump unit, which is kept at a pressure range between $5\times10^{-4}$ and $5\times10^{-2}$ millibar by a vacuum pump.

16. Device as in claim 13, wherein at least one of the temporary stores is designed as a wire-coiled double helix, with connections to voltages from an RF generator and with terminal reflectors.

17. Device as in claim 16, wherein at least one of the reflectors is a double spiral with a connection to the RF voltage of the RF generator of the double helix.

18. Device as in claim 13, wherein the ions in the temporary stores are subject to a thrust in an axial direction of at least one of the temporary stores through electrical fields.

19. Device as in claim 18, wherein the ion thrust in an axial direction is formed by the pseudopotential which results from a conical design of a temporary store having such thrust.

20. Device as in claim 13, wherein a last of the temporary stores has a gas supply line through which a reactant gas can be fed.

* * * * *